(12) United States Patent
Fang et al.

(10) Patent No.: US 11,849,155 B2
(45) Date of Patent: *Dec. 19, 2023

(54) THERMOSTAT, SYSTEM AND METHOD FOR PROVIDING AWARENESS IN A HOSPITALITY ENVIRONMENT

(71) Applicant: Enseo, LLC, Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

(*) Notice: Subject to any disclaimer, the term of this patent is extended or adjusted under 35 U.S.C. 154(b) by 45 days.

This patent is subject to a terminal disclaimer.

(21) Appl. No.: 17/230,570

(22) Filed: Apr. 14, 2021

(65) Prior Publication Data
US 2021/0235131 A1    Jul. 29, 2021

Related U.S. Application Data

(63) Continuation-in-part of application No. 16/826,532, filed on Mar. 23, 2020, now abandoned, which is a
(Continued)

(51) Int. Cl.
*H04N 21/214* (2011.01)
*H04N 21/4363* (2011.01)
(Continued)

(52) U.S. Cl.
CPC ........... *H04N 21/2143* (2013.01); *G07C 1/00* (2013.01); *H04N 21/23605* (2013.01);
(Continued)

(58) Field of Classification Search
CPC ......... H04N 21/2143; H04N 21/23605; H04N 21/25841; H04N 21/4108; H04N 21/414; H04N 21/42224; H04N 21/4343; H04N 21/43637; H04N 21/4516; H04N 21/4524; G07C 1/00; H04W 84/12
See application file for complete search history.

(56) References Cited

U.S. PATENT DOCUMENTS 8,766,194 B2   7/2014 Filson et al.
8,942,853 B2   1/2015 Stefanski et al.
(Continued)

*Primary Examiner* — Yassin Alata
(74) *Attorney, Agent, or Firm* — Scott Griggs; Griggs Bergen LLP

(57) ABSTRACT

A system and method for providing awareness in a hospitality environment are presented. In one embodiment, a vertical and horizontal array of thermostats is provided and each thermostat includes an identification corresponding to a room in which the thermostat is placed. Each thermostat includes a wireless transceiver that periodically transmits an identification beacon signal that is received by a proximate wireless-enabled programmable interactive device. The proximate wireless-enabled programmable interactive device, in turn, broadcasts data packets including an indication of the strength of thermostat identification signals received. The broadcasts are received by a server via an array of wireless routers. A location of the proximate wireless-enabled programmable interactive device is determined based on the signal strength information in the data packets.

20 Claims, 6 Drawing Sheets

Related U.S. Application Data continuation of application No. 16/149,284, filed on Oct. 2, 2018, now Pat. No. 10,602,195, which is a continuation of application No. 15/824,867, filed on Nov. 28, 2017, now Pat. No. 10,091,534, which is a continuation of application No. 15/596,181, filed on May 16, 2017, now Pat. No. 9,832,490, which is a continuation of application No. 15/145,448, filed on May 3, 2016, now Pat. No. 9,654,826, which is a continuation of application No. 14/461,484, filed on Aug. 18, 2014, now Pat. No. 9,332,304.

(60) Provisional application No. 63/127,542, filed on Dec. 18, 2020, provisional application No. 61/935,862, filed on Feb. 5, 2014.

(51) Int. Cl.

| | | |
|---|---|---|
| *H04N 21/258* | (2011.01) | |
| *H04N 21/434* | (2011.01) | |
| *H04N 21/45* | (2011.01) | |
| *H04N 21/41* | (2011.01) | |
| *H04N 21/414* | (2011.01) | |
| *H04N 21/422* | (2011.01) | |
| *H04N 21/236* | (2011.01) | |
| *G07C 1/00* | (2006.01) | |
| *H04W 84/12* | (2009.01) | |

(52) U.S. Cl.
CPC ..... *H04N 21/25841* (2013.01); *H04N 21/414* (2013.01); *H04N 21/4108* (2013.01); *H04N 21/42221* (2013.01); *H04N 21/4343* (2013.01); *H04N 21/43637* (2013.01); *H04N 21/4516* (2013.01); *H04N 21/4524* (2013.01); *H04W 84/12* (2013.01)

(56) References Cited

U.S. PATENT DOCUMENTS

| | | |
|---|---|---|
| 9,332,304 B2 | 5/2016 | Ogle et al. |
| 9,344,757 B2 | 5/2016 | Ogle et al. |
| 9,357,254 B2 | 5/2016 | Ogle et al. |
| 9,587,848 B2 | 3/2017 | Adamik et al. |
| 9,654,826 B2 | 5/2017 | Ogle et al. |
| 9,654,827 B2 | 5/2017 | Ogle et al. |
| 9,712,872 B2 | 7/2017 | Ogle et al. |
| 9,800,932 B2 | 10/2017 | Ogle et al. |
| 9,832,490 B2 | 11/2017 | Ogle et al. |
| 9,857,090 B2 | 1/2018 | Golden et al. |
| 9,857,091 B2 | 1/2018 | Robideau et al. |
| 10,091,534 B2 | 10/2018 | Ogle et al. |
| 10,104,402 B2 | 10/2018 | Ogle et al. |
| 10,142,662 B2 | 11/2018 | Ogle et al. |
| 10,602,195 B2 | 3/2020 | Ogle et al. |
| 10,764,735 B2 | 9/2020 | Horton et al. |
| 10,767,883 B2 | 9/2020 | Malcolm et al. |
| 10,785,047 B1 | 9/2020 | Bodkin et al. |
| 10,853,733 B2 | 12/2020 | Fadell et al. |
| 2011/0099575 A1 | 4/2011 | Woo et al. |
| 2015/0156030 A1 | 6/2015 | Fadell et al. |
| 2016/0040903 A1 | 2/2016 | Emmons et al. |
| 2016/0277796 A1 | 9/2016 | Ogle et al. |
| 2017/0318341 A1 | 11/2017 | Ogle et al. |
| 2018/0077459 A1* | 3/2018 | Ogle .................. H04N 21/4524 |
| 2019/0037248 A1 | 1/2019 | Ogle et al. |
| 2019/0045229 A1 | 2/2019 | Ogle et al. |
| 2019/0098340 A1 | 3/2019 | Ogle et al. |
| 2020/0025402 A1 | 1/2020 | Bell et al. |
| 2020/0045522 A1* | 2/2020 | Horton .................. F24F 11/523 |
| 2020/0386437 A1 | 12/2020 | Roosli |

\* cited by examiner

THERMOSTAT, SYSTEM AND METHOD FOR PROVIDING AWARENESS IN A HOSPITALITY ENVIRONMENT

PRIORITY STATEMENT & CROSS-REFERENCE TO RELATED APPLICATION

This application claims priority from U.S. Provisional Patent Application Ser. No. 63/127,542 entitled "Thermostat, System and Method for Providing Awareness in a Hospitality Environment" filed on Dec. 18, 2020, in the name of William C. Fang; which is hereby incorporated by reference, in entirety, for all purposes. This application is also a continuation-in-part of U.S. patent application Ser. No. 16/826,532 entitled "Set-Top Box, System and Method for Providing Awareness in a Hospitality Environment" filed on Mar. 23, 2021, in the names of William C. Fang et al.; which is a continuation of U.S. patent application Ser. No. 16/149,284 entitled "Set-Top Box, System and Method for Providing Awareness in a Hospitality Environment" filed on Oct. 2, 2018, in the names of Vanessa Ogle et al., now U.S. Pat. No. 10,602,195 and issued on Mar. 24, 2020; which is a continuation of U.S. patent application Ser. No. 15/824,867 entitled "Set-Top Box, System and Method for Providing Awareness in a Hospitality Environment" filed on Nov. 28, 2017, in the names of Vanessa Ogle et al., now U.S. Pat. No. 10,091,534 and issued on Oct. 2, 2018; which is a continuation of U.S. patent application Ser. No. 15/596,181 entitled "Set-Top Box, System and Method for Providing Awareness in a Hospitality Environment" filed May 16, 2017, in the names of Vanessa Ogle et al., now U.S. Pat. No. 9,832,490 and issued on Nov. 28, 2017; which is a continuation of U.S. patent application Ser. No. 15/145,448 entitled "Set-Top Box, System and Method for Providing Awareness in a Hospitality Environment" filed May 3, 2016, in the names of Vanessa Ogle et al.; now U.S. Pat. No. 9,654,826 and issued on May 16, 2017; which is a continuation of U.S. patent application Ser. No. 14/461,484 entitled "Set-Top Box, System and Method for Providing Awareness in a Hospitality Environment" filed on Aug. 18, 2014, in the names of Vanessa Ogle et al., now U.S. Pat. No. 9,332,304 and issued on May 3, 2016; which claims the benefit of U.S. Provisional Patent Application Ser. No. 61/935,862 entitled "System and Method for Providing Awareness in a Hospitality Environment" filed on Feb. 5, 2014; all of which are hereby incorporated by reference, in entirety, for all purposes.

This application discloses subject matter related to the subject matter disclosed in the following commonly owned, co-pending U.S. patent application Ser. No. 17/230,274 entitled "Thermostat, System and Method for Providing Awareness in a Hospitality Environment" and filed on Apr. 14, 2021, in the name of William C. Fang; which claims the benefit from U.S. Provisional Patent Application Ser. No. 63/127,489, entitled "Thermostat, System and Method for Providing Awareness in a Hospitality Environment" and filed on Dec. 18, 2020 in the name of William C. Fang; This application discloses subject matter related to the subject matter disclosed in the following commonly owned, co-pending U.S. patent application Ser. No. 17/230,345 entitled "Thermostat, System and Method for Providing Awareness in a Hospitality Environment" and filed on Apr. 14, 2021, in the name of William C. Fang; which claims the benefit from U.S. Provisional Patent Application Ser. No. 63/127,516, entitled "Thermostat, System and Method for Providing Awareness in a Hospitality Environment" and filed on Dec. 18, 2020 in the name of William C. Fang; This application discloses subject matter related to the subject matter disclosed in the following commonly owned, co-pending U.S. patent application Ser. No. 17/230,553 entitled "Thermostat, System and Method for Providing Awareness in a Hospitality Environment" and filed on Apr. 14, 2021, in the name of William C. Fang; which claims the benefit from U.S. Provisional Patent Application Ser. No. 63/127,530, entitled "Thermostat, System and Method for Providing Awareness in a Hospitality Environment" and filed on Dec. 18, 2020 in the name of William C. Fang; all of which are hereby incorporated by reference, in entirety, for all purposes.

TECHNICAL FIELD OF THE INVENTION

This invention relates, in general, to devices and systems for monitoring and controlling heating and cooling in a room or other environment to a setpoint temperature and, in particular, to thermostats, as well as systems and methods for providing awareness in a hospitality environment, such as a lodging establishment, motel, or hotel, for example.

BACKGROUND OF THE INVENTION

Without limiting the scope of the present invention, the background will be described in relation to employee safety in hospitality environments, as an example. Employees face increased personal security risks at work in hospitality environments, such as lodging establishments, motels, and hotels, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve awareness in hospitality environments that would decrease personal security risks to workers. It would also be desirable to enable a wireless-based solution that would mitigate or eliminate the cost of providing increased security in lodging establishments, such as a motel, or hotel, for example. More generally, it would be desirable to enable such a solution for any multi-unit environment including hospitality environments, educational campuses, hospital campuses, office buildings, multi-unit dwellings, sport facilities and shopping malls, whether a single story, multiple stories, or a combination thereof. To better address one or more of these concerns, systems and methods, including a thermostat, are disclosed for providing awareness in hospitality environments. In one embodiment of the system, a vertical and horizontal array of thermostats is provided and each thermostat includes an identification corresponding to the room in which the thermostat is placed. Each thermostat includes a wireless transceiver that periodically transmits an identification beacon that is received by a proximate wireless-enabled interactive device. The proximate wireless-enabled interactive device, in turn, broadcasts data packets including an indication of the strength of thermostat identification signals received. The broadcasts are received by a server via an array of wireless routers. The location of the proximate wireless-enabled interactive device is determined based on the signal strength information in the data packets. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
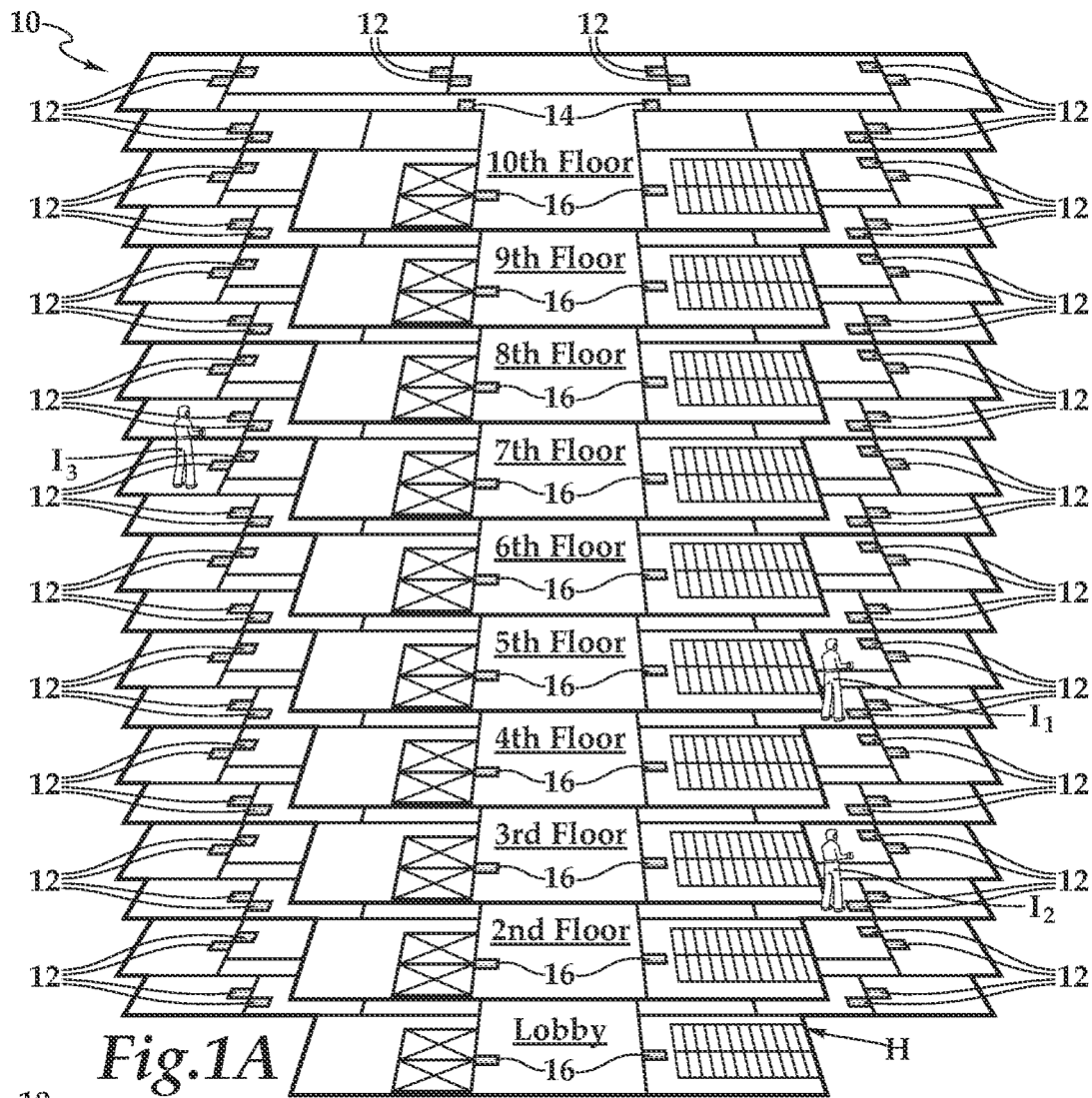
FIG. 1A is schematic building diagram depicting one embodiment of a system for providing awareness in a hospitality environment illustrated as a hotel, according to the teachings presented herein.
Figure 1B:
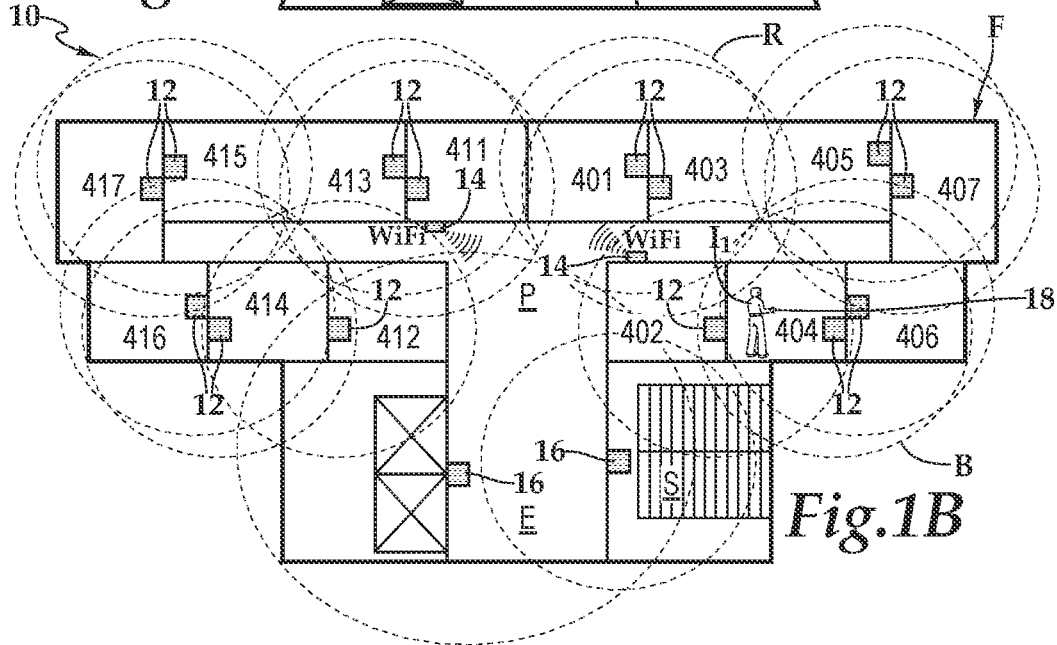
FIG. 1B is a schematic floor plan depicting a floor of the hotel presented in FIG. 1A in further detail.

Referring initially to FIGS. 1A and 1B, therein is depicted a system for providing awareness in a hospitality environment, such as a furnished multi-family residence, dormitory, lodging establishment, hotel, hospital, or other multi-unit environment which is schematically illustrated and designated 10. More generally, the system 10 and the teachings presented herein are applicable to any multi-unit environment including hospitality environments, educational campuses, hospital campuses, office buildings, multi-unit dwellings, sport facilities, and shopping malls.

As shown, by way of example and not by way of limitation, the hospitality environment is depicted as a hotel H having a lobby and floors F, which are appropriately labeled the $2^{nd}$ floor through the 10th floor. Further, by way of example, the $4^{th}$ floor is depicted with rooms 401, 402, 403, 404, 405, 406, 407, 411, 412, 413, 414, 415, 416, and 417. Additionally, a common area near the elevators is labeled E, a hallway labeled P, and a stairwell is labeled S.

Thermostats 12 are communicatively disposed with various amenities, including an HVAC system, associated with the hospitality environment, which as mentioned is depicted as the hotel H. By way of example, each thermostat 12 may be a wall-mounted unit that is an information appliance device that generally contains convenience and safety functionality, in addition to monitoring and controlling heating and cooling in a room or other environment to a setpoint temperature. Such a thermostat may be used as an informational appliance that is coupled to various hospitality suites of service provided by the hotel H, including, for example, check in/check out, maid service, spa, room service, and front desk. As shown, each room includes the thermostat 12. The thermostats are deployed as part of a horizontal and vertical array, which is generally a spatial array, throughout the hotel H. It should be appreciated, however, that the thermostats and more generally deployment of the system may include a horizontal array. Further, the deployment may be in a single story, multiple stories, or a combination thereof.

In one embodiment, each of the thermostats 12 emits a beacon, which is illustrated as field B, for identifying itself to detecting programmable devices, as will be discussed hereinbelow. In the aforementioned common areas, including the elevators E, the hallway P, and the stairwell S, beacon devices 16 are depicted that emit fields B for identifying themselves to the programmable devices also. Wireless routers 14 are deployed as part of a horizontal and vertical array, or more generally a spatial array, throughout the hotel H to send and receive information. As shown, the wireless routers 14 are WiFi enabled. It should be appreciated however that the wireless routers 14 may communicate via infrared (IR), 802.11, 3G, 4G, Edge, ZigBee, near field communications (NFC), or Bluetooth and Bluetooth low energy, for example.

The thermostats 12 and the beacon devices 16, which are collectively beacons, periodically transmit beacons to the programmable devices, such as a wireless-enabled programmable device 18, being utilized by individual $I_1$. The wireless-enabled programmable device 18 may be a wireless-enabled programmable interactive device that may be supplied or carried by the user or guest and may be selected from a range of existing devices, such as, for example, smart watches, smart phones, tablet computers, and laptops. In another implementation, the wireless-enabled programmable device 18 may be a special purpose device, including a battery powered personal locator device. As shown individual $I_1$ works in the hospitality industry at hotel H and is presently working on the $4^{th}$ floor. As the individual $I_1$ is working in room 404, the wireless-enabled programmable device 18 is receiving beacons from the thermostat 12 that is located within the room 404. Additionally, the wireless-enabled programmable device 18 is receiving beacons from the thermostat 12 that is located within the room 406.

Figure 1C:
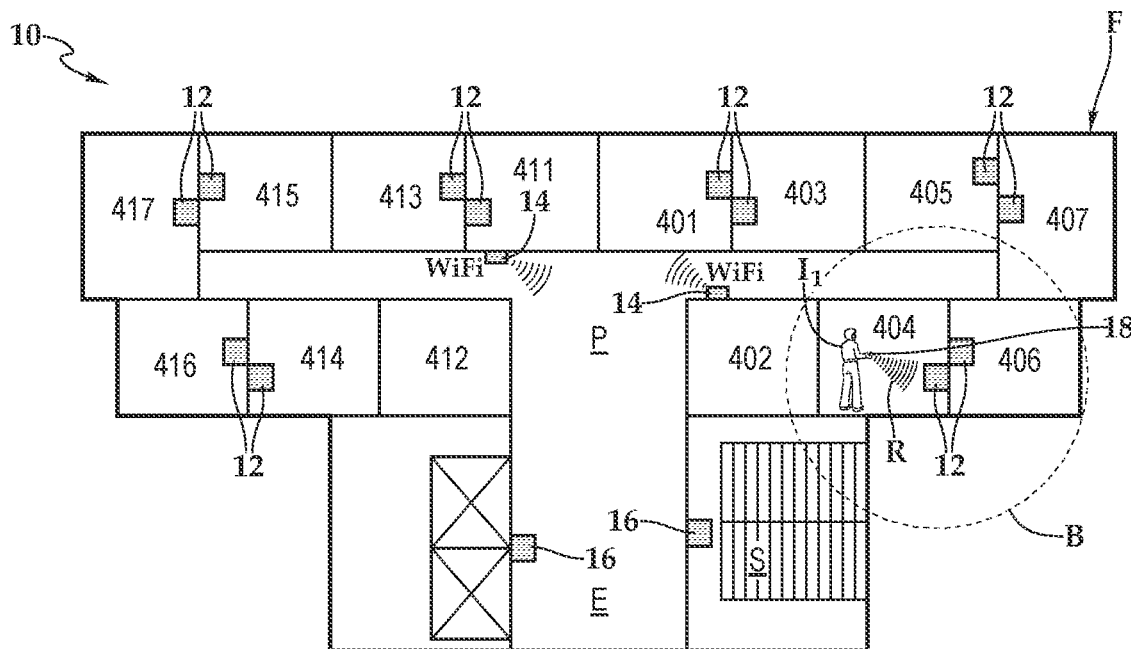
FIG. 1C is a schematic floor plan depicting a floor of the hotel presented in FIG. 1A in further detail, wherein an event requiring an alert is occurring.
Figure 2:
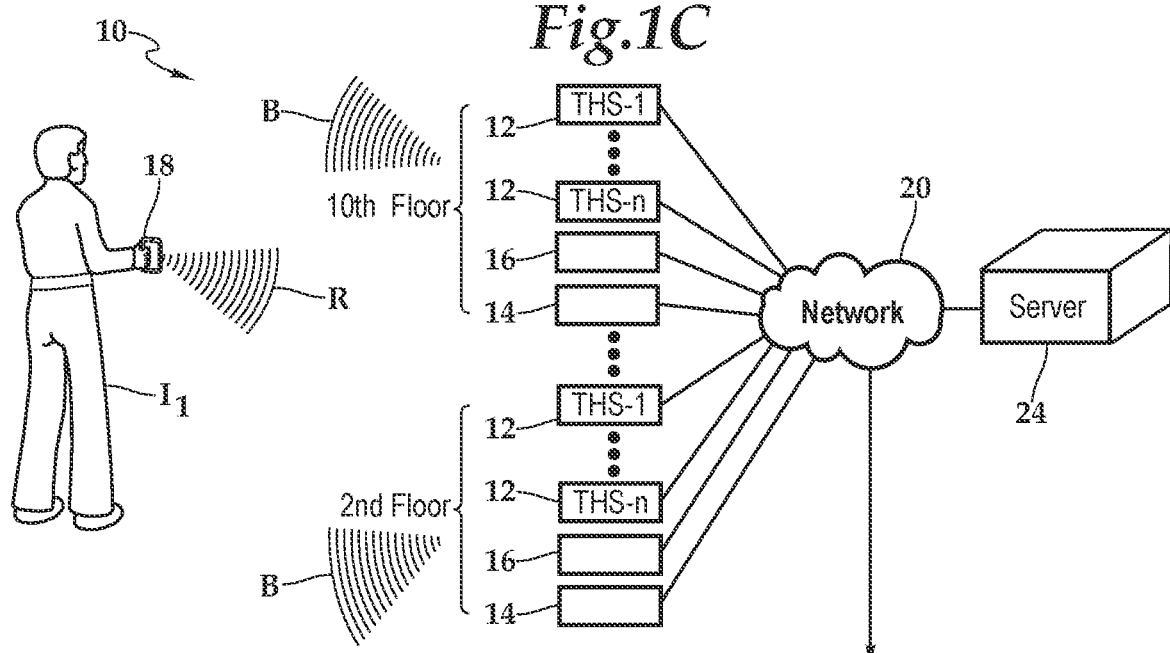
FIG. 2 is a schematic block diagram depicting one embodiment of the signal flow in the system presented in FIG. 1A.

Referring now to FIGS. 1C and 2, the individual $I_1$ having the wireless-enabled programmable device 18, which is receiving the beacons from the thermostat 12 located within the room 404 and the thermostat 12 located within the room 406, perceives danger and requires assistance and help. The individual $I_1$ activates the wireless-enabled programmable device 18, which sends a data packet that, via the wireless routers 14 and the network 20, communicates with a server 24. The server 24, in turn, sends out the appropriate notifications to various phones 26, to activate alarms 28, or notify others via a computer, such as computer 30. As a spatial array of horizontal and vertical thermostats 12 and the beacon devices 16 are provided, the system presented herein is able to determine the location of the individual $I_1$ within a building. The location information determined includes which floor the individual $I_1$ is presently located as well as the room or common area.

In another mode of operation, the individual 12 is located on the $2^{nd}$ floor of the hotel H. This individual is within the field of several beacons, including thermostats and common area beacon devices. The wireless-enabled interactive device associated with the individual 12 periodically broadcasts a data packet to the server 24, via the wireless routers 14 and the network 20. The location of this individual is known and the individual 12 publishes the location so that others may contact this individual or find this individual. Similarly, the location of the individual 13 is known to be on the $7^{th}$ floor of the hotel H. The individual uses associated wireless-enabled interactive device to report service requests to the management of the hotel H.

Figure 3:
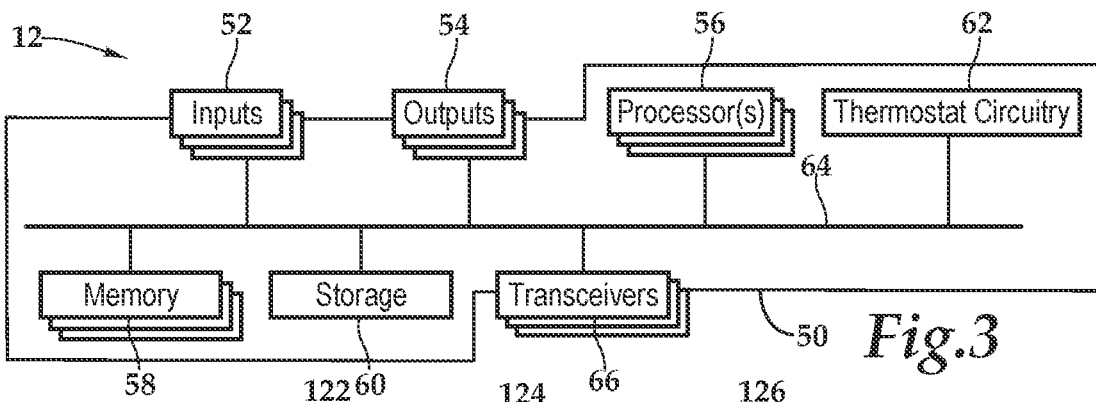
FIG. 3 is a functional block diagram depicting one embodiment of a thermostat that forms a portion of the system presented in FIG. 1A.

Referring now to FIG. 3, within a housing 50, inputs 52, outputs 54, processor or processors 56, memory 58, storage 60, and thermostat circuitry 62 are interconnected by a busing architecture 64 within a mounting architecture. The processor 56 may process instructions for execution within the computing device, including instructions stored in the memory 58 or in the storage 60. The memory 58 stores information within the computing device. In one implementation, the memory 58 is a volatile memory unit or units. In another implementation, the memory 58 is a non-volatile memory unit or units. Storage 60 provides capacity that is capable of providing mass storage for the thermostat 12. The various inputs 52 and outputs 54 provide connections to and from the computing device, wherein the inputs 52 are the signals or data received by the thermostat 12, and the outputs 54 are the signals or data sent from the thermostat 12.

Multiple transceivers 66 may be associated with the thermostat 12 and communicatively disposed with the busing architecture 64. As shown the transceivers 66 may be internal, external, or a combination thereof to the housing. Further, the transceivers 66 may be a transmitter/receiver, receiver, or an antenna for example. Communication between various amenities proximate to the thermostat 12 and the thermostat 12 may be enabled by a variety of wireless methodologies employed by the transceiver 66, including 802.11, 802.15, 802.15.4, 3G, 4G, Edge, Wi-Fi, ZigBee, near field communications (NFC), Bluetooth low energy, and Bluetooth, for example. Also, infrared (IR) may be utilized.

The processor-executable instructions periodically transmit an identification signal including thermostat identification that may be received by a proximate wireless-enabled programmable interactive device. As previously discussed, the wireless-enabled programmable device 18 may include an application, which assists in the receiving, or alternatively a NFC protocol may be utilized to facilitate the receiving of the identification. In many embodiments of the beacon methodology, physical proximity between the wireless-enabled programmable device 18 and the thermostat 12 is leveraged to establish signaling therebetween.

Figure 4:
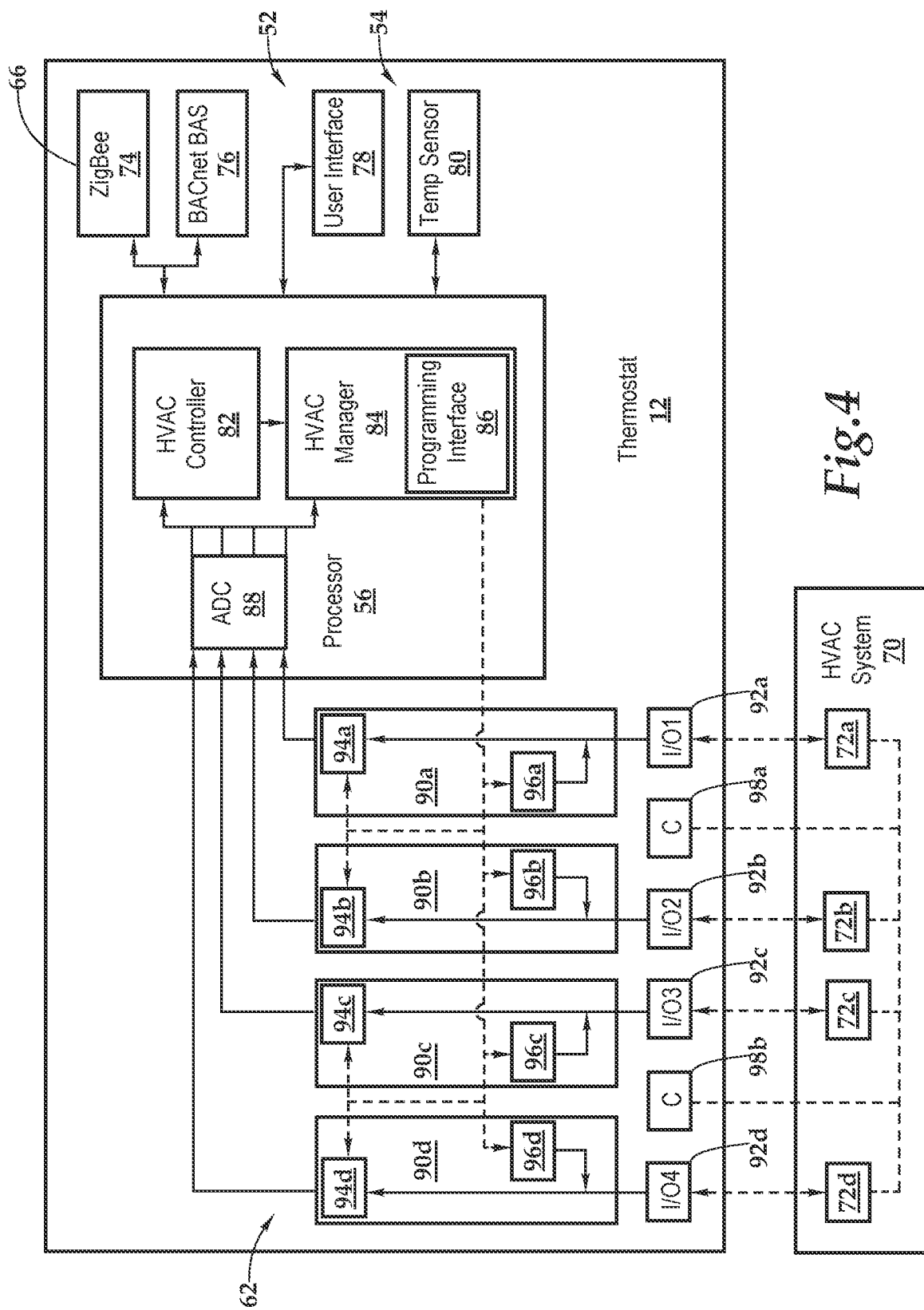
FIG. 4 is a functional block diagram depicting one operational embodiment of a portion of the thermostat shown in FIG. 3.

FIG. 4 depicts another operational embodiment of a portion of the thermostat 12 shown in FIG. 3. In this operational embodiment, the thermostat 12 is located in communication with an HVAC system 70, which may be servicing the various parts of the floor F and/or the hotel H, or portions thereof, for example. The HVAC system 70 includes terminal connections 72a, 72b, 72c, and 72d providing an interface to various components of the HVAC system 70, including cooling, heating, humidity, and electronic air cleaning, for example. The terminal connections 72a, 72b, 72c, 72d are provided by way of nonlimiting example and it should be appreciated that the number and configuration of terminal connections may vary depending on the HVAC system 70 and application.

As shown, the thermostat circuitry 62 is interposed between the processor 56 and the HVAC system 70. The transceiver 66 communicates with the processor 56 and the transceiver 66 is depicted as a ZigBee antenna 74 in this embodiment. The inputs 52 and the outputs 54 to the thermostat 12 include a wired input/output device 76, a user interface 78, and a temperature sensor 80.

In the illustrated embodiment, the processor 56 includes an HVAC controller 82, an HVAC manager 84 having a programming interface 86, and an analog-to-digital converter (ADC) 88. The thermostat circuitry 62 includes interface circuits 90a, 90b, 90c, 90d coupled to terminal interfaces 92a, 92b, 92c, 92d. Each of the interface circuits 90a, 90b, 90c, 90d have an amplifier circuit 94a, 94b, 94c, 94d and an input/output circuit 96a, 96b, 96c, 96d.

The processor 56 may execute machine-readable instructions stored in memory on behalf of the thermostat 12. By way of example, the processor 56 may include a microprocessor having one or more cores, microcontroller, application-specific integrated circuit (ASIC), digital signal processor, digital logic devices configured to execute as a state machine, analog circuits configured to execute as a state machine, or a combination of the above, for example. The processor 56 stores instructions that may include at least one of HVAC controller logic embodied in the HVAC controller 82 and configurable input and output manager logic embodied in HVAC manager 84. In one embodiment, the HVAC manager 84 may include the programming interface 86, which is configured to communicate with the thermostat 12 and provide process-executable instructions thereto by way of non-transitory memory accessible to the processor 56.

The HVAC controller 82 is configured to receive and store user selectable configuration parameters for configuring, via the HVAC manager 84, the terminal connections 72a, 72b, 72c, 72d of the HVAC system 70 as part of the monitoring and controlling of heating and cooling in a room or other environment to a setpoint temperature. The HVAC controller 82 communicates the various configuration parameters and setpoint temperature to the HVAC manager 84, which may also receive configuration parameters from the programming interface 86.

In the illustrated embodiment, the HVAC manager 84 generates and outputs a group of configuration control signals for each of the input/output circuits 96a, 96b, 96c, 96d and each associated amplifier circuit 94a, 94b, 94c, 94d of the interface circuits 90a, 90b, 90c, 90d based on the parameters to communicate with the HVAC system 70. Once the terminal interfaces 92a, 92b, 92c, 92d have been configured for a respective input or output interface signal type by the interface circuits 90a, 90b, 90c, 90d, the amplifier circuits 94a, 94b, 94c, 94d may employ one or more of the configuration control signals to scale and normalize the feedback signals from the respective terminal interfaces 92a, 92*b*, 92*c*, 92*d* to the interface circuits 90*a*, 90*b*, 90*c*, 90*d*, which, in turn, drive signals to the ADC 88, which, as mentioned, forms a portion of the processor 56. The ADC 88 converts the feedback signal to a multi-bit digital signal that be provided to or stored in memory associated with the processor 56 for access by both the HVAC controller 82 and the HVAC manager 84 for further processing. As shown in the implementation presented in FIG. 4, the thermostat 12 may also include one or more common, neutral return or earth ground terminals 98*a* and 98*b* for connecting to a respective common, neutral return or earth ground connection of the HVAC system 70, for example.

As mentioned hereinabove, in one implementation, the thermostat 12 includes the transceiver 66, shown as a ZigBee antenna 74. The thermostat 12 may also include the wired input/output device 76 that may employ a standard network communication protocol, such as BACnet™ or other network protocol, for enabling signal communication to and from the thermostat 12. The thermostat 12 may further include the user interface 78 coupled to the processor 56 via a standard bus or other bi-directional parallel or serial communication protocol connection. The user interface 78 may be a standard touch screen or combination of a keyboard and display, or other input/output device. When executing instructions provided by a user or programming software or firmware contained in a setup or configuration application, for example, the processor 56 may generate and display a screen via the user interface 78 that includes a user selectable settings input to enable a user, whether a guest, resident, technician, or thermostat installer, to identify system parameters to the processor 56 pertaining to the HVAC system 70. The temperature sensor 80 provides input regarding the temperature at or near the thermostat 12. It should be appreciated that although a particular thermostat architecture is presented in FIG. 4, other architectures are within the teachings presented herein.

Figure 5:
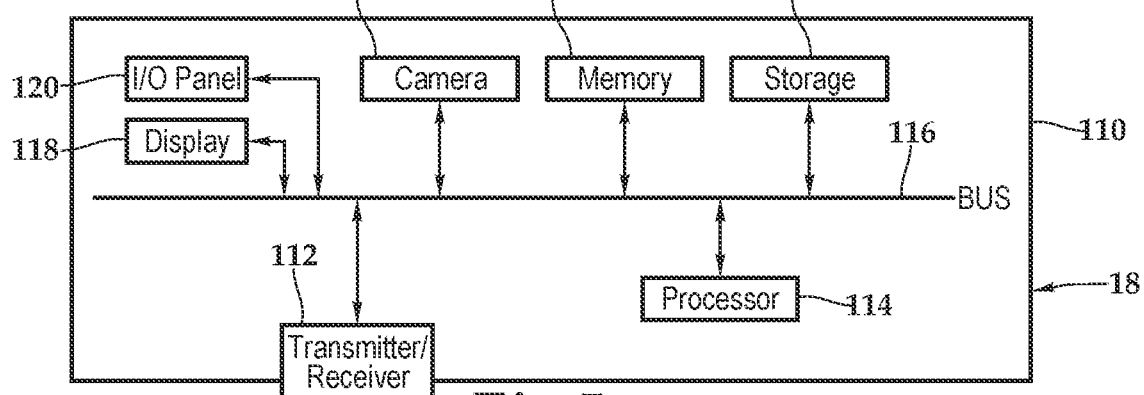
FIG. 5 is a functional block diagram depicting one embodiment of a programmable device, which is a component of the system presented in FIG. 1A.

Referring now to FIG. 5, the wireless-enabled programmable device 18 may be a wireless communication device of the type including various fixed, mobile, and/or portable devices. To expand rather then limit the previous discussion of the wireless-enabled programmable device 18, such devices may include, but are not limited to, cellular or mobile telephones, two-way radios, personal digital assistants, digital music players, Global Position System units, and so forth. The wireless-enabled programmable device 18, within housing 110, may include a transmitter/receiver 112, a processor 114, a busing architecture 116, a display 118, an I/O panel 120, a camera 122, memory 124, and storage 126. It should be appreciated that although a particular architecture is explained, other designs and layouts are within the teachings presented herein.

In operation, the teachings presented herein permit a wireless-enabled programmable device 18 such as a smart phone or simple transmitter to communicate with a thermostat that is able to relay an alert with location to a main server and security or other individuals needing to know about the emergency. In the operation embodiment being described, the wireless-enabled programmable device 18 may be "paired" on a temporary basis to the thermostat on a room-by-room basis, whereby the pairing changes as the hospitality employees location changes, thereby changing the strongest received signal.

As shown, the wireless-enabled programmable device 18 includes the memory 124 accessible to the processor 114 and the memory 124 includes processor-executable instructions that, when executed, cause the processor to receive thermostat identification beacon signals and measure the strength of the identification beacon signals. The wireless-enabled programmable device 18 then periodically transmits a broadcast signal including a data packet having at least one thermostat identification, a corresponding signal strength identification indicating the strength of the thermostat identification beacon signal, and a proximate wireless-enabled interactive device identification.

Figure 6:
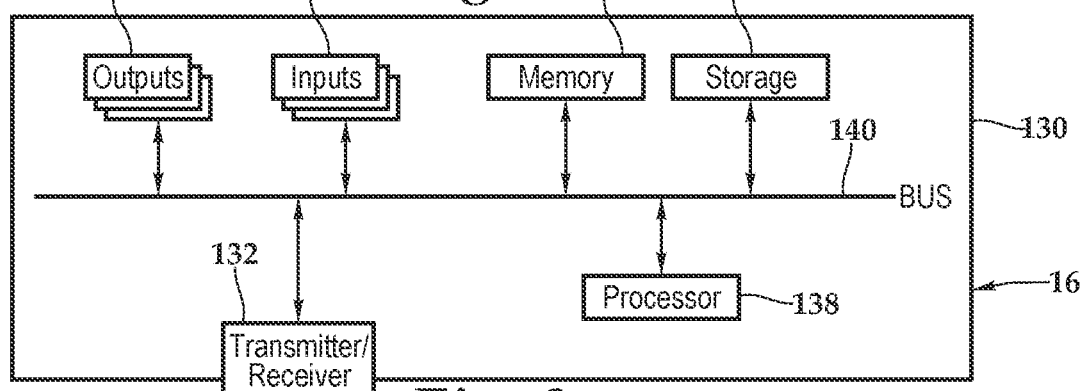
FIG. 6 is a functional block diagram depicting one embodiment of a beacon, which is a component of the system presented in FIG. 1A.

Referring now to FIG. 6, the beacon device 16 shown. With respect to the beacon device 16, a housing 130 protects a transmitter/receiver 132, outputs 134, inputs 136, a processor 138, a busing architecture 140, memory 142 and storage 144. The memory 142 is accessible to the processor 138, and the memory 142 includes processor-executable instructions that, when executed, cause the processor 138 to periodically transmit, via the transmitter/receiver 132, an identification beacon signal including beacon device identification.

Figure 7:
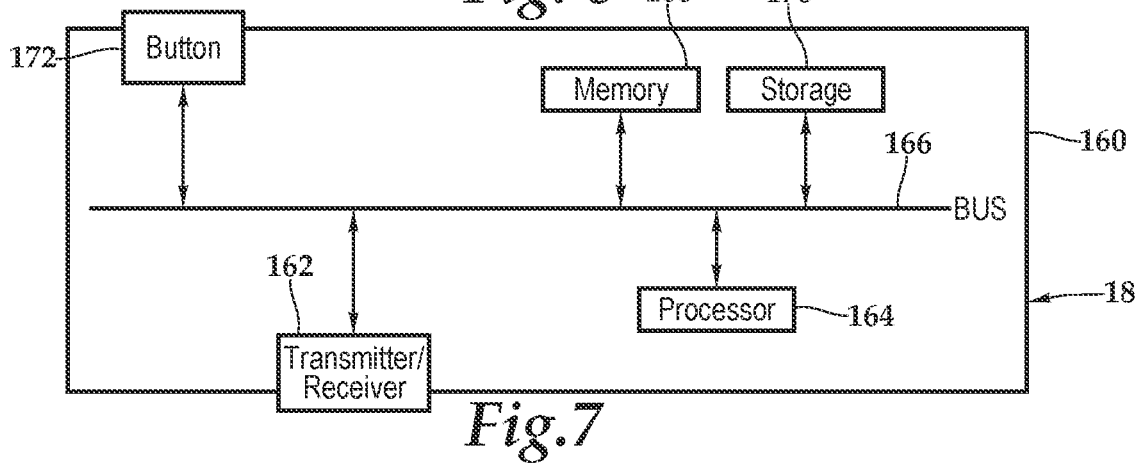
FIG. 7 is a functional block diagram depicting another embodiment of a programmable device, which is a component of the system presented in FIG. 1A.

Referring now to FIG. 7, with respect to the wireless-enabled programmable device 18, a housing 160 protects a transmitter/receiver 162, a processor 164, busing architecture 166, memory 168 and storage 170. A button 172 provides the activation that triggers the alert. As shown, the wireless-enabled programmable device 18 includes the memory 168 accessible to the processor 164 and the memory 168 includes processor-executable instructions that, when executed, cause the processor 164 to receive thermostat identification beacon signals and measure the strength of the identification beacon signals. The wireless-enabled programmable device 18 then periodically transmits a broadcast signal including a data packet having at least one thermostat identification, a corresponding signal strength identification indicating the strength of the thermostat identification beacon signal, and a proximate wireless-enabled interactive device identification. Responsive to the activation of the emergency button, the wireless-enabled programmable device 18 immediately transmits a broadcast signal including a data packet having at least one thermostat identification, a corresponding signal strength identification indicating the strength of the thermostat identification beacon signal, a proximate wireless-enabled interactive device identification, and an emergency alert.

Figure 8:
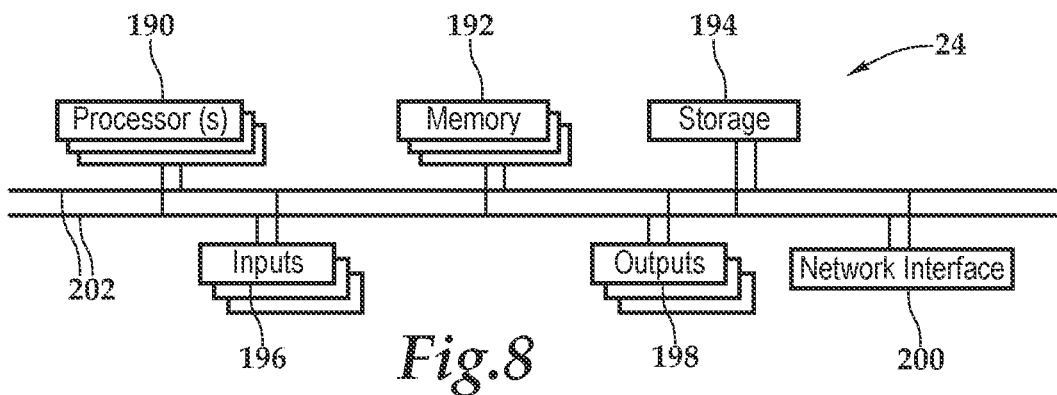
FIG. 8 is a functional block diagram depicting one embodiment of a server, a component of the system presented in FIG. 2.

Referring to FIG. 8, one embodiment of the server 24 as a computing device includes a processor 190, memory 192, storage 194, inputs 196, outputs 198, and a network interface 200 interconnected with various busing architectures 202 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 190 may process instructions for execution within the server 24, including instructions stored in the memory 192 or in the storage 194. The memory 192 stores information within the computing device. In one implementation, the memory 192 is a volatile memory unit or units. In another implementation, the memory 192 is a non-volatile memory unit or units. The storage 194 includes capacity that is capable of providing mass storage for the server 24. The various inputs 196 and outputs 198 provide connections to and from the server 24, wherein the inputs 196 are the signals or data received by the server 24, and the outputs 198 are the signals or data sent from the server 24. The network interface 200 provides a point of interconnection between the server 24 and another computing device or network, such as the network 20 of FIG. 2. The network interface 200 may include applicable hardware and software interfaces between various protocol layers for network-based communication.

The memory 192 is accessible to the processor 190 and includes processor-executable instructions that, when executed, cause the processor 190 to execute a series of operations. The processor-executable instructions receive the data packet from the proximate wireless-enabled interactive device and process the data packet to determine the thermostat/beacon device or, more generally, beacon identification of strongest signal strength and the proximate wireless-enabled interactive device identification. Based on this analysis, the instructions determine the location of the proximate wireless-enabled interactive device as being proximate to the set-to box or beacon device of strongest signal strength. Depending on the configuration of the wireless-enabled interactive device, the processor-executable instructions update a database with the location and timestamp of the proximate wireless-enabled interactive device. Further, the processor-executable instructions may transmit a service request relative to the wireless-enabled interactive device, publish the location of the wireless-enabled interactive device, or execute an emergency alert or alarm.

Figure 9A:
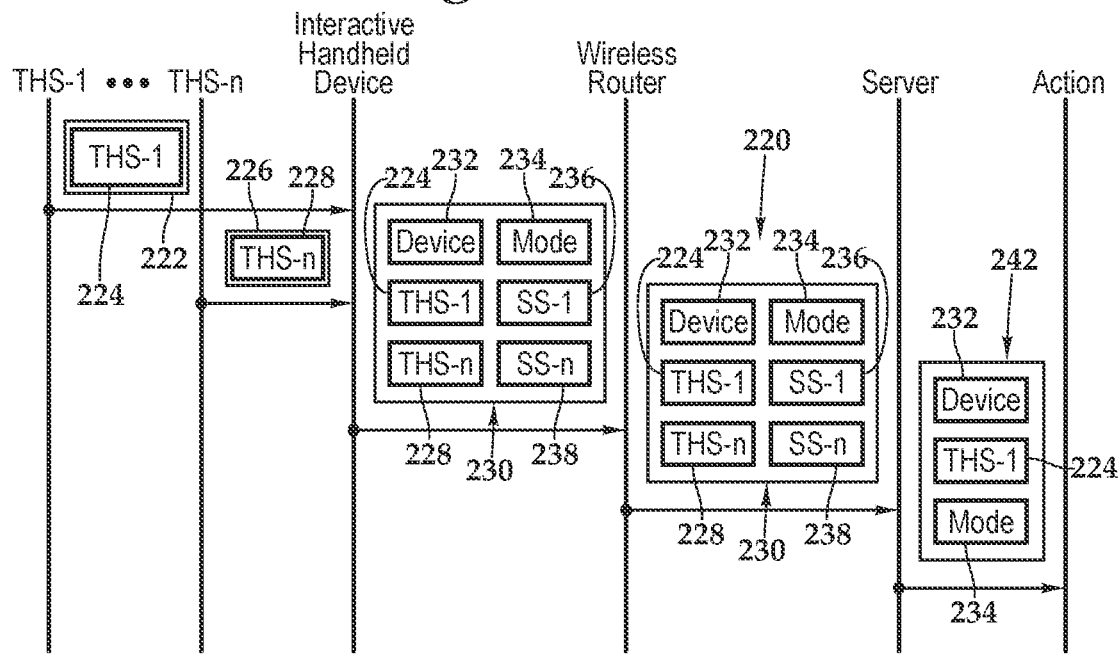
FIG. 9A is a signal flow diagram depicting one embodiment of signalization and data transfer within the system presented in FIG. 1A.

FIG. 9A illustrates one embodiment of signalization and data transfer 220. As shown, thermostats 1 through n respectively transfer data packet 222 including beacon identification 224 and data packet 226 including beacon identification 228. The data packets 222, 226 are received by a wireless-enabled programmable interactive device, which determines the signal strength of each received data packet 222, 226. The wireless-enabled programmable interactive device then establishes data packet 230, including device indicator 232, mode of operation indicator 234, beacon identifications 224, 228, and respective signal strength identification 236, 238.

Once the data packet 230 is broadcast, it is received by a wireless router which relays the data packet 230 as data packet 230 that is received by a server. The server analyzes the data packet and determines that the wireless-enabled programmable interactive device is proximate to the thermostat 12 as the signal strength associated with received data packet of thermostat 12 is strongest. The server then sends out a signal 242, which includes the device identification 232, the location as represented by a thermostat and the mode of operation indicator 234 for appropriate action.

Figure 9B:
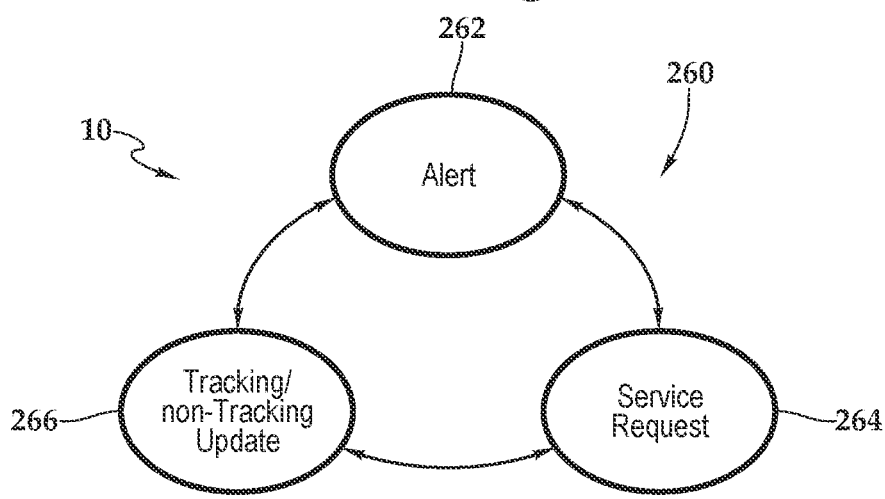
FIG. 9B is state diagram depicting one embodiment of the states of the system presented in FIG. 1A.

FIG. 9B depicts one embodiment of a state diagram 260 of the states of the system 10, which include an alert mode of operation 262, a service request mode of operation 264, and a tracking/non-tracking update mode of operation 266. As will be appreciated, the modes of operation may overlap or, to a partial or full extent be combined. In the alert mode of operation 262, a user of a wireless-enabled interactive device may send an alert to indicate distress. In the service request mode of operation, the user may send a service along with the location information. The tracking/non-tracking update mode indicates the level of privacy the user expects and how much of the location history will be saved.

Figure 10:
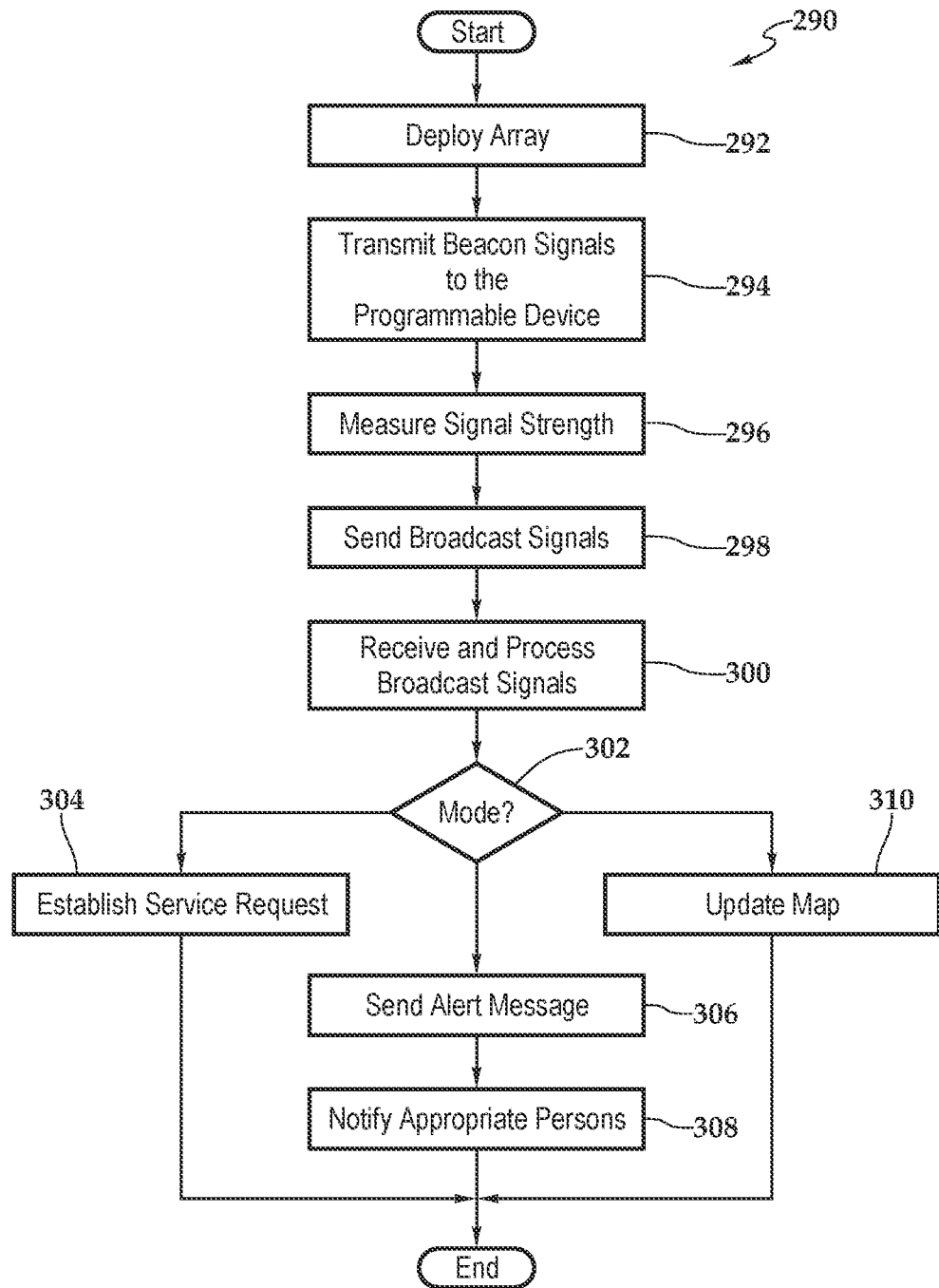
FIG. 10 is a flow chart depicting one embodiment of a method for providing awareness in a hospitality environment according to the teachings presented herein.

FIG. 10 depicts one embodiment of a method 290 for providing awareness in a hospitality environment, according to the teachings presented herein. At block 292, the array of thermostats and common area beacons is deployed vertically and horizontally throughout the hospitality environment. At block 294, beacon signals are periodically transmitted from the thermostats and common area beacons to be received by the wireless-enabled interactive devices.

At block 296, the signal strength between the beacon transmission of the thermostats and the common area beacons at the wireless-enabled interactive programmable device is measured. At block 298, the wireless-enabled interactive programmable device broadcasts data packets, including the beacon identifications and associated signal strengths. At block 300, via the wireless routers, the server receives and processes the data packets. At decision block 302, the server takes action based on the mode of operation. In a first mode of operation at block 304, a service request is associated with the location of the user utilizing the location of the wireless-enabled interactive programmable device as a proxy. In a second mode of operation at block 306, an emergency alert is sent and subsequent notification at block 308 occurs. The emergency alert includes an indication of distress and the location of the user utilizing the location of the wireless-enabled interactive programmable device as a proxy. In a third mode of operation at block 310, the map of individuals is updated with the location of the user, if privacy settings are being enabled, the system maintains the privacy of the individual working in the hospitality environment such that the system only retains in memory the last known position and time of the user-supplied wireless-enabled programmable interactive device. Further, in this mode of operation, the system does not reveal the location of the individual and programmable device unless and until an alert is issued.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a hospitality environment, the system comprising:
   an array of thermostats, each thermostat being associated with a room in the hospitality environment, each thermostat having an identification including a room identifier;
   each thermostat of the array of thermostats including:
      a housing;
      a wireless transceiver associated with the housing, the wireless transceiver configured to send a beacon signal to communicate with a proximate wireless-enabled programmable device;
      a processor coupled to the wireless transceiver;
      memory accessible to the processor, the memory including processor-executable instructions that, when executed, cause the processor to:
         periodically transmit an identification beacon signal including thermostat identification;
   a data packet associated with the proximate wireless-enabled programmable device, the data packet including at least one of the thermostat identification, and a proximate wireless-enabled programmable device identification;
   an array of wireless routers disposed in the hospitality environment, each wireless router configured to receive the data packet from the proximate wireless-enabled programmable device and forward the data packet; and a location of the proximate wireless-enabled programmable device being determined following communication from the array of thermostats to the proximate wireless-enabled programmable device to the array of wireless routers to a server.

2. The system as recited in claim 1, wherein the wireless transceiver is configured to communicate with a standard selected from the group consisting of infrared (IR), 802.11, 3G, 4G, Edge, WiFi, ZigBee, near field communications (NFC), Bluetooth and Bluetooth low energy.

3. The system as recited in claim 1, wherein the wireless routers are configured to communicate with a standard selected from the group consisting of infrared (IR), 802.11, 3G, 4G, Edge, WiFi, ZigBee, near field communications (NFC), Bluetooth and Bluetooth low energy.

4. The system as recited in claim 1, wherein the wireless routers are configured to communicate with a WiFi standard.

5. The system as recited in claim 1, wherein the proximate wireless-enabled programmable device further comprises a user-supplied wireless-enabled programmable interactive device.

6. The system as recited in claim 1, wherein the proximate wireless-enabled programmable device further comprises a single button personal locator device.

7. The system as recited claim 1, wherein the system further comprises an operational mode selected from the group consisting of alerts-enabled, service request-enabled, tracking-enabled, and non-tracking-enabled.

8. The system as recited in claim 7, wherein in the alerts-enabled mode, the server receives via the array of wireless routers a distress signal from the proximate wireless-enabled programmable device.

9. The system as recited in claim 7, wherein in the service-request-enabled mode, the server receives via the array of wireless routers a service request from the proximate wireless-enabled programmable device.

10. The system as recited in claim 7, wherein in the tracking-enabled mode, the server maintains a plurality of locations with timestamps associated with the data packet of the proximate wireless-enabled programmable device.

11. The system as recited in claim 7, wherein in the non-tracking-enabled mode, the server maintains only last known locations with timestamps associated with the data packet of the proximate wireless-enabled programmable device.

12. The system as recited in claim 1, wherein the server further comprises a back-office hotel server in communication with the array of thermostats.

13. The system as recited in claim 1, wherein the array of thermostats further comprises a plurality of common space beacon devices, each common space beacon device having an identification including a common space.

14. The system as recited in claim 13, wherein each of the common space beacon devices further comprises:
a processor coupled to a wireless transceiver; and
memory accessible to the processor, the memory including processor-executable instructions that, when executed, cause the processor to:
periodically transmit an identification beacon signal including beacon device identification.

15. A system for providing awareness in a hospitality environment, the system comprising:

an array of thermostats, each thermostat being associated with a room in the hospitality environment, each thermostat having an identification including a room identifier;

the array of thermostats including a plurality of common space beacon devices, each common space beacon device having an identification including a common space;

each thermostat of the array of thermostats including:
a housing;
a wireless transceiver associated with the housing, the wireless transceiver configured to send a beacon signal to communicate with a proximate wireless-enabled programmable device;
a processor coupled to the wireless transceiver;
memory accessible to the processor, the memory including processor-executable instructions that, when executed, cause the processor to:
periodically transmit an identification beacon signal including thermostat identification;

each of the beacon devices including:
a processor coupled to a wireless transceiver; and
memory accessible to the processor, the memory including processor-executable instructions that, when executed, cause the processor to:
periodically transmit the identification beacon signal including beacon device identification;

a data packet associated with the proximate wireless-enabled programmable device, the data packet including at least one of the beacon device identification, and a proximate wireless-enabled programmable device identification;

an array of wireless routers disposed in the hospitality environment, each wireless router configured to receive the data packet from the proximate wireless-enabled programmable device and forward the data packet; and a location of the proximate wireless-enabled programmable device being determined following communication from the array of thermostats to the proximate wireless-enabled programmable device to the array of wireless routers to a server.

16. The system as recited in claim 15, wherein the wireless transceiver is configured to communicate with a standard selected from the group consisting of infrared (IR), 802.11, 3G, 4G, Edge, WiFi, ZigBee, near field communications (NFC), Bluetooth and Bluetooth low energy.

17. The system as recited in claim 15, wherein the wireless routers are configured to communicate with a WiFi standard.

18. The system as recited in claim 15, wherein the system further comprises an operational mode selected from the group consisting of alerts-enabled, service request-enabled, tracking-enabled, and non-tracking-enabled.

19. The system as recited in claim 15, wherein the server further comprises a back-office hotel server in communication with the array of thermostats.

20. A system for providing awareness in a hospitality environment, the system comprising:

an array of thermostats, each thermostat being associated with a room in the hospitality environment, each thermostat having an identification including a room identifier;

the array of thermostats including a plurality of common space beacon devices, each common space beacon device having an identification including a common space;

each thermostat of the array of thermostats including:

a housing;

a wireless transceiver associated with the housing, the wireless transceiver configured to send a beacon signal to communicate with a proximate wireless-enabled programmable device;

the wireless transceiver being configured to communicate with a standard selected from the group consisting of infrared (IR), 802.11, 3G, 4G, Edge, WiFi, ZigBee, near field communications (NFC), Bluetooth and Bluetooth low energy;

a thermostat circuitry configured to monitor and control heating and cooling in the room to a setpoint temperature;

a processor coupled to the wireless transceiver;

memory accessible to the processor, the memory including processor-executable instructions that, when executed, cause the processor to:
periodically transmit an identification beacon signal including thermostat identification;

each of the beacon devices including:
a processor coupled to a wireless transceiver; and
memory accessible to the processor, the memory including processor-executable instructions that, when executed, cause the processor to:
periodically transmit the identification beacon signal including beacon device identification;

a data packet associated with the proximate wireless-enabled programmable device, the data packet including at least one of the beacon device identification, and a proximate wireless-enabled programmable device identification;

an array of wireless routers disposed in the hospitality environment, each wireless router configured to receive the data packet from the proximate wireless-enabled programmable device and forward the data packet;

the wireless routers being configured to communicate with a WiFi standard; and the location of the proximate wireless-enabled programmable device being determined following communication from the array of thermostats to the proximate wireless-enabled programmable device to the array of wireless routers to a server.

* * * * *